July 7, 1964
D. E. LAWSON
3,140,086
SEAT CONSTRUCTION
Filed Sept. 25, 1961
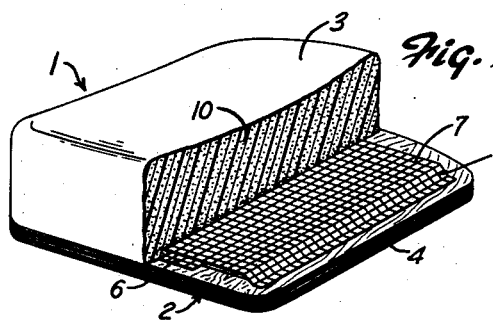
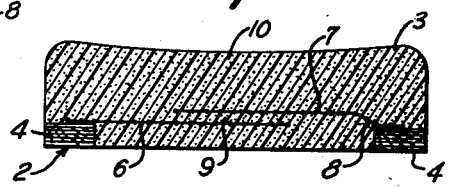
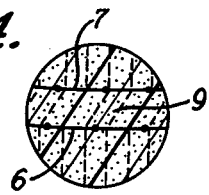
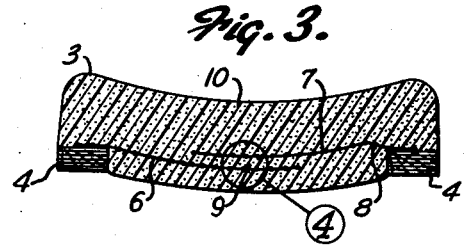
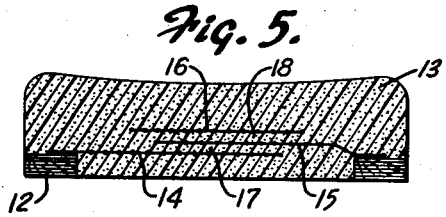
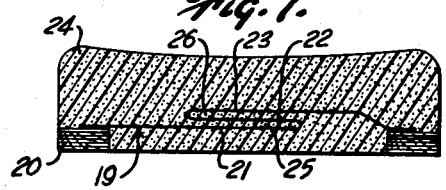
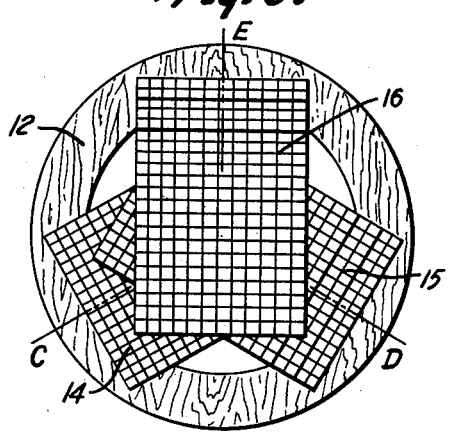
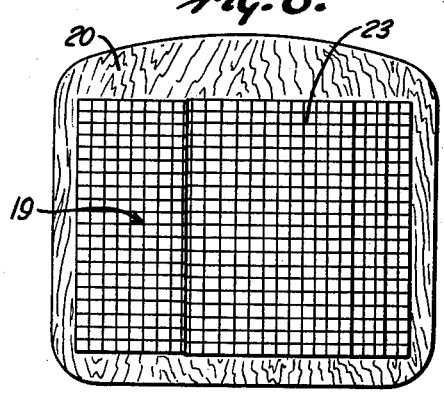
INVENTOR.
David E. Lawson
BY Andrus & Starke
Attorneys

3,140,086
SEAT CONSTRUCTION
David E. Lawson, 2021 Middleton Beach Road, Middleton, Wis.
Filed Sept. 25, 1961, Ser. No. 140,301
15 Claims. (Cl. 267—111)

This invention relates to a load supporting structure and more particularly to a seat construction which includes a foam plastic cushion reinforced with a plurality of spaced, overlapping, flexible sheets.

Seats or other load bearing structures have been fabricated in the past from foam plastic materials. The foam plastic material in itself does not have sufficient compressive strength to withstand a substantial load and therefore various types of reinforcement have been employed to take up the load to which the foam plastic cushion is subjected. The most common type of reinforcement is a coil spring unit which is located within a recess formed in the bottom of the foam plastic cushion, while in other structures the spring elements are embedded within the foam plastic. The spring exerts an upward force which resists the load applied to the cushion and the crown of foam plastic located above the reinforcement hides the reflection or the upward force of the spring and provides softness to the touch.

The present invention is directed to a novel load bearing structure, such as a seat or the like, which contains no springs or other resilient materials.

According to the invention the structure includes a frame which supports a foam plastic cushion. A plurality of generally flat, flexible sheets of open mesh material are embedded within the cushion and the foam plastic is firmly bonded to both sheets. One end of each sheet of mesh is secured to the frame while the free end of each sheet of mesh is disposed in spaced, lapping relation with the free end of the other sheet of mesh.

When a load is applied to the seat cushion, the upper layer or crown of the foam plastic is initially compressed and as the load is increased, the reinforcing sheets will be deformed and the free ends will tend to move relative to each other in substantially parallel planes and in different directions with the result that a substantial shear stress is developed in the portion of the foam plastic located between the overlapping portions of the sheets. The shear stress set up within the foam plastic serves to resist the load applied to the cushion.

The seat construction of the invention is a simple, inexpensive structure which replaces springs and related materials. This construction substantially reduces material and tooling costs and also results in a considerable time saving in manufacture.

The upper crown of foam plastic material provides softness to the touch and when a substantial load is applied to the seat, the shear stress developed in the foam plastic material between the overlapping layers of mesh serves to effectively resist the load and provide a firm bottoming for the seat construction.

As no springs are incorporated in the seat construction, there is no upward force being exerted within the cushion which can be felt nor is there any sound or spring-squeak when a load is applied to the seat.

Other objects and advantages will appear in the course of the following description.

The drawings illustrate the best mode presently contemplated of carrying out the invention.

In the drawings:

FIG. 1 is a perspective view of the seat construction of the invention with parts broken away in section;

FIG. 2 is a cross section showing the seat construction in its normal position before a load is applied to it;

FIG. 3 is a view similar to FIG. 2 showing the seat construction in the compressed condition under load;

FIG. 4 is an enlarged fragmentary section showing the area of foam plastic between the overlapping sheets of mesh;

FIG. 5 is a view similar to FIG. 2 of a modified form of the invention using three reinforcing sheets;

FIG. 6 is a horizontal section taken along line 6—6 of FIG. 5;

FIG. 7 is a view similar to FIG. 2 and showing a second modified form of the invention using a single reinforcing sheet; and FIG. 8 is a horizontal section taken along line 8—8 of FIG. 7.

The drawings illustrate a seat construction 1 including a frame 2 which supports a foam plastic cushion 3.

As shown in the drawings, the frame 2 is formed of wood and includes a pair of side members 4 which are connected together at their ends by a pair of end members 5 to provide a generally rectangular frame. While the drawings show the frame 2 to be generally rectangular in shape, it is contemplated that the frame may take any desired shape, such as circular, oval and the like, and may be a solid member or formed with a central opening as shown in the drawings.

The cushion 3 is formed from a foam plastic material such as any of the conventional foaming resins, such as polyurethane, polyester and the like. The cushion 3 is reinforced by a pair of sheets 6 and 7 of open mesh material. As shown in FIGS. 1 and 2, one end of each of the sheets 6 and 7 is secured by stapling or nailing to the respective side members 4 and the free ends of the sheets 6 and 7 extend inwardly across the opening in the frame 2 in overlapping relation. As best seen in FIG. 2, the overlapping ends of the sheets 6 and 7 are spaced apart, and to provide the spacing, the sheet 7 is provided with a diagonal or offset portion indicated by 8 which extends upwardly from the frame so that the overlapping portion of sheet 7 will be spaced from the underlying portion of sheet 6.

The foam plastic material extends within the openings or perforations in sheets 6 and 7 and is bonded to both the sheets 6 and 7.

The sheets 6 and 7 can be formed of any flexible material of open construction, such as wire mesh, fabric netting, woven fabric, perforated sheet metal, perforated plastic sheeting, woven plastic fibers, and the like. The openings or perforations in the sheets 6 and 7 should be in the range of ¼" to 2" in size with the specific size depending upon the type of foam plastic employed and the dimensions and use of the seat cushion. It has been found that wire mesh, having a mesh size of ½", is very satisfactory for use as sheets 6 and 7 in a theater seat cushion made of polyurethane foam.

The perforations or openings in the sheets 6 and 7 serve to provide an anchor or roughened surface area so that the foam plastic will be firmly bonded to the sheets with the result that the shear action occurring within the portion of the foam plastic 9 located between the overlapping sheets 6 and 7 will not break the bond between the foam plastic and the sheets. The surface roughness can also be achieved by using flexible sheets with knobs, knurls, projections, serrations, or the like, rather than the openings as shown in the drawings.

The upper layer or crown 10 of foam plastic located above the upper sheet 7 provides a softness to the touch for the cushion. The crown 10 generally has a thickness in the range of ¼" to 2" with 1" being very satisfactory for most applications. The specific thickness of the crown depends on the dimensions and use of the seat cushion.

Under normal no-load conditions the sheets 6 and 7 are substantially parallel to each other and are substantially parallel to the upper surface 11 of the cushion 3. When a load is applied to the seat, the crown 10 is initially compressed and as the loading is continued, the sheets 6 and 7 will be deformed or deflected downwardly as shown in FIG. 3 with the result that the free overlapping ends of the sheets will tend to pull apart or pull away from each other in opposite parallel directions as shown by the arrows in FIG. 4. This results in a shear stress being set up within the foam plastic 9 located between the overlapping portions of the sheets. The shear stress created in the foam plastic serves to resist the continued load applied to the cushion. As the load is increased, the shear stress set up in the resin is correspondingly increased so that the force of the load is effectively resisted.

To obtain a balanced load resistance, the centerline of attachment of sheet 6 to frame 2 should be approximately opposite the centerline of attachment of sheet 7 to frame 2 so that the free ends of the sheets tend to move in opposite directions when the cushion is subjected to a load.

In fabricating the seat cushion of the invention, a mold having the shape of cushion 3 is inverted with the open end facing upwardly and a suitable releasing agent applied to the mold surface. The liquid foam plastic is poured into the mold and the skeleton or framework, consisting of frame 2 and the attached sheets 6 and 7, is positioned in the open end of the mold. A suitable locating device, such as aligning pins, may be employed to properly align the frame 2 with respect to the mold.

To space the sheets 6 and 7 apart during the molding operation, a small scrap of cured foam plastic can be inserted between the overlapping portions of the sheets.

The liquid plastic will foam upwardly within the mold, passing through the openings in the sheets 6 and 7 to firmly bond or anchor the sheets to the plastic. After the foaming is complete, the plastic is cured by placing the mold in an oven at a temperature in the range of 150° F. to 300° F.

After curing, the seat 1 can be stripped from the mold and the lower end of the foam plastic is trimmed flush with the frame 2.

The use of the reinforcing sheets with openings or perforations facilitates the molding operation, for the plastic will foam upwardly through the openings to the top of the mold, and thereby enable the seat to be formed in a single molding operation. If solid, roughened sheets are used, several pouring operations would be required in molding a single seat cushion.

A modified form of the invention is shown in FIGS. 5 and 6. In this embodiment, a generally circular frame 12 supports a cushion 13 similar to cushion 3 of the first embodiment. Three sheets of material 14, 15 and 16 of open construction, similar to sheets 6 and 7, are attached at one end to frame 12 and the free ends are disposed in spaced overlapping relation. The foam plastic of cushion 13 is bonded to the sheets 14, 15 and 16 and when a load is applied to the cushion, the sheets tend to move in parallel planes, causing a shear stress to be set up in the portions of the foam plastic 17 and 18 located between the overlapping portions of sheets 14 and 15 and sheets 15 and 16, respectively. As in the first embodiment, the shear stress serves to resist the load applied to the cushion.

As best shown in FIG. 6, the centerline of attachment C of sheet 14 to frame 12 is located 120° from the centerline of attachment D of sheet 15 to frame 12 and is located 120° from the centerline of attachment E of sheet 16 to frame 12. As the centerlines C, D and E are spaced an equal distance apart, a balanced shear stress condition is achieved which will effectively withstand the load.

It is contemplated that any number of reinforcing sheets can be employed in the cushion. The free ends of the sheets should be in spaced, overlapping relation and the centerlines of attachment of each sheet to the frame should be uniformly spaced to achieve a balanced pattern of shear stress between the overlapping ends of the sheets.

A second modified form of the invention is shown in FIGS. 7 and 8. In this embodiment, a single sheet of reinforcing material 19, similar to sheets 6 and 7, is secured at its ends to the side members of frame 20 and extends across the opening in the frame. The central portion of sheet 19 is provided with a double reverse or S bend to provide three generally parallel, spaced, superimposed sections 21, 22 and 23.

The frame 20 supports a cushion 24 of foam plastic material, similar in construction and function to cushion 3, and the foam plastic is firmly bonded to the sheet 19.

The seat construction shown in FIGS. 7 and 8 functions in a manner similar to that of the first two embodiments, and when a load is applied to the cushion, a shear stress is set up in the portions of foam plastic 25 and 26 located between the overlapping sections 21 and 22 and between the sections 22 and 23. The shear stress serves to resist the load applied to the cushion in a manner previously described.

The structures shown in FIGS. 5 and 6 and shown in FIGS. 7 and 8 are fabricated in the manner set forth with respect to the structure of FIGS. 1–4.

The seat construction of the invention provides a very simple and inexpensive type of reinforcement for a foam plastic cushion which replaces springs and related materials. The shear stress developed in the plastic between the sheets 6 and 7 serves to resist the load applied to the cushion. Due to the shear action, the lower surface of the cushion 3 is deflected to a very small degree under load, which reduces the feeling of "dropping" into the seat and produces a floating action at a given load.

The use of the reinforcing sheets results in the total elimination of spring reflection; that is, there is no upward force being exerted by spring which is apparent to the touch.

The invention can be used for articles such as theater seats, boat seats, automobile seats, household chair seats, mattresses, and other load bearing structures.

Various modes of carrying out the invention are contemplated as being within the scope of the following claims particularly pointing out and distinctly claiming the subject matter regarded as the invention.

I claim:

1. A load supporting structure, comprising a frame, a foam plastic cushion supported by the frame and having an outer load supporting surface, reinforcing means embedded within and bonded to the foam plastic cushion, said reinforcing means including a first portion disposed parallel to said outer surface and including a second portion disposed generally parallel to said outer surface and spaced from said first portion and disposed in overlapping relation with said first portion, means for attaching said first portion to the frame, and means for attaching said second portion to the frame at a location spaced from the position of attachment of said first portion to the frame, said portions of said reinforcing means tending to move relative to each other in their respective planes when a load is applied to the cushion to thereby develop a shear stress within the portion of the foam plastic located between the overlapping portions with the shear stress effectively resisting the load applied to the cushion.

2. The structure of claim 1, in which the means for attaching said first portion to the frame is located approximately opposite the means for attaching said second portion to the frame to thereby provide a balanced stress pattern for resisting the load applied to the cushion.

3. A seat construction or the like, comprising a generally rectangular frame having a central opening therein, a foam plastic cushion supported by the frame and having an upper load supporting surface, and a pair of sheets of material of open construction with said sheets having a mesh size in the range of ¼" to 2", one end portion of one of the pair of sheets being attached to an edge portion of the frame and one end portion of the other of the pair of sheets being attached to the opposite edge portion of the frame, the opposite end portions of the sheets extending across the opening in the frame and being embedded within and bonded to the foam plastic, said opposite end portions of the sheets being disposed in spaced overlapping relation and being located in planes substantially parallel to the upper surface of the cushion and said opposite end portions tending to move relative to each other in their respective planes and in opposite directions when a load is applied to the cushion to thereby set up a shear stress within the portion of the foam plastic located between said overlapping end portions with the shear stress effectively resisting the load applied to the cushion.

4. The structure of claim 3 in which the foam plastic cushion extends upwardly beyond the uppermost of said overlapping end portions a distance in the range of 1" to 6" to provide a crown for the cushion.

5. A load bearing structure, comprising a frame, a foam plastic cushion supported by the frame and having a load supporting surface, a first sheet of flexible reinforcing material embedded within the cushion and bonded to said foam plastic, said first sheet having an end secured to the frame and having a portion extending across the center portion of the cushion, and a second sheet of flexible reinforcing material embedded within the cushion and bonded to said foam plastic, said second sheet having an end secured to the frame and having a portion extending across the center portion of said cushion in spaced overlapping relation in a direction normal to said load supporting surface with said portion of said first sheet, said overlapping portions of the sheets being spaced apart a distance in the range of ¼" to 2", said sheets tending to move in generally parallel planes and at an angle to each other when a load is applied to the cushion to thereby set up a shear stress in the portion of the foam plastic located between said overlapping portions of the sheet with the shear stress effectively resisting the load applied to the cushion.

6. The structure of claim 5 in which the sheets are formed of wire mesh and the foam plastic is polyurethane resin.

7. A seat construction or the like, comprising a frame, a foam plastic cushion supported by the frame and having an upper surface adapted to receive a load, and a plurality of sheets of flexible reinforcing material embedded within the cushion and bonded to said foam plastic, each of said sheets having an end secured to the frame and having a portion extending across the center of the cushion with said portions of the sheets being disposed in spaced overlapping relation, the centerlines of attachment of said ends of the sheets of the frame being equally spaced around the frame to provide a balanced shear stress pattern, said sheets tending to move relatively to each other in generally parallel planes and at an angle to each other when a load is applied to the cushion to thereby develop a shear stress within the portions of the foam plastic located between said overlapping portions of the sheets with the shear stress effectively resisting the load applied to the cushion.

8. The structure of claim 7 in which the reinforcing sheets are of open construction and have openings of a size in the range of ¼" to 2" and the overlapping end portions of the sheets are spaced apart a distance in the range of ¼" to 2".

9. A load supporting structure, comprising a frame, a foam plastic cushion supported by the frame, a flexible reinforcing sheet having one end connected to one side of the frame and the other end connected to the opposite side of said frame and the central portion of the sheet being embedded within the cushion and bonded to the foam plastic, said central portion of the sheet being provided with at least two reversed bends to provide a plurality of spaced overlapping sections, said sections tending to move relative to each other in generally parallel planes and in opposite directions when a load is applied to the cushion to thereby set up a shear stress within the portion of the foam plastic located between said overlapping sections with the shear stress effectively resisting the load applied to the cushion.

10. A seat construction comprising a frame, a substantially resilient foam plastic cushion supported by the frame and having an upper load supporting surface, reinforcing means embedded within and bonded to the foam plastic cushion, said reinforcing means including a first section disposed generally parallel to said upper surface and including a second section disposed parallel to and spaced from said first section and disposed in overlapping relation with said first section, said sections of the reinforcing means having a plurality of surface deviations to provide an increased bond between said reinforcing means and said foam plastic, means for attaching said first section to the frame, and means for attaching said second section to the frame at a location spaced from the position of attachment of said first portion to the frame, said sections of said reinforcing means tending to move relative to each other when a load is applied to the cushion to thereby develop a shear stress within the portion of the foam plastic located between the overlapping sections with the shear stress effectively resisting the load applied to said surface.

11. A load supporting structure, comprising a frame having a central opening therein, a foam plastic cushion supported by the frame and having an upper load supporting surface, flexible sheet-like reinforcing means embedded within and bonded to the foam plastic cushion, said reinforcing means including a first portion disposed parallel to said load supporting surface and extending across said opening and including a second portion disposed generally parallel to said load supporting surface and extending across said opening, said second portion being spaced from the first portion and disposed in lapping relation therewith, means for attaching said first portion to the frame, and means for attaching said second portion to the frame at a location spaced from the position of attachment of said first portion to the frame.

12. A seat construction comprising a frame, a substantially resilient foam plastic cushion supported by the frame and having an upper load supporting surface, a first reinforcing member embedded within the cushion and bonded to the foam plastic, said first reinforcing member disposed generally parallel to said load supporting surface and having one end attached to the frame and the opposite end of said first reinforcing member being free of attachment to said frame, and a second reinforcing member embedded within the cushion and bonded to the foam plastic, said second reinforcing member disposed generally parallel to said load supporting surface and having one end attached to the frame at a location spaced from the attachment of the first reinforcing member to the frame, the opposite end of said second reinforcing member being free of attachment to said frame, and a portion of said second reinforcing member disposed in spaced lapping relation with a portion of said first reinforcing member, said reinforcing members tending to move relatively to each other in generally parallel planes when a load is applied to the load supporting surface to stretch and distort the foam plastic located between the lapping portions of said reinforcing members and thereby resist the load applied to said surface.

13. The structure of claim 12, in which the reinforcing members are lapped in a direction normal to said load supporting surface.

14. A seat construction comprising a frame, a substantially resilient foam plastic cushion supported by the frame and having a generally horizontal load supporting surface, a first reinforcing member embedded within the cushion and bonded to the foam plastic, said first reinforcing member disposed generally parallel to said load supporting surface and having one end attached to the frame and the opposite end of said reinforcing member being free of attachment to said frame, and a second reinforcing member embedded within the cushion and bonded to the foam plastic, said second reinforcing member disposed generally parallel to said load supporting surface and having one end attached to the frame at a location spaced from the attachment of the first reinforcing member to the frame, the opposite end of said second reinforcing member being free of attachment to said frame, a portion of the second reinforcing member disposed in spaced vertical overlapping relation with a portion of said first reinforcing member, said reinforcing members tending to move relative to each other in generally parallel planes when a load is applied to a load supporting surface to stretch and distort foam plastic located between the lapping portions of said reinforcing members and thereby resist the load applied to said surface.

15. A seat construction comprising a frame, a substantially resilient foam plastic cushion supported by the frame and having a generally horizontal upper load supporting surface, a first reinforcing member embedded within the cushion and bonded to the foam plastic, said first reinforcing member having one end portion attached to the frame and the opposite end portion of said first reinforcing member being free of attachment to said frame and disposed in a generally horizontal plane parallel to said load supporting surface, and a second reinforcing member embedded within the cushion and bonded to the foam plastic, said second reinforcing member having one end portion attached to the frame at a location spaced from the attachment of the first reinforcing member to the frame and the opposite end portion of said second reinforcing member being free of attachment to said frame and disposed in a generally horizontal plane located above the plane of said opposite end portion of the first reinforcing member, said opposite end portion of the second reinforcing member being disposed in spaced vertical overlapping relation with the opposite end portion of the first reinforcing member, said opposite end portions tending to move relative to each other in generally parallel planes when a load is applied to the load supporting surface to stretch and distort the foam plastic located between the overlapping portions of said reinforcing members and thereby resist the load applied to said surface.

References Cited in the file of this patent

UNITED STATES PATENTS

| | | |
|---|---|---|
| 2,156,301 | Loewus | May 2, 1939 |
| 2,858,881 | Newall et al. | Nov. 4, 1958 |
| 2,949,956 | Harris | Aug. 23, 1960 |
| 3,801,077 | Sudman | Mar. 12, 1963 |